United States Patent [19]
Matsubara et al.

[11] Patent Number: 5,876,600
[45] Date of Patent: Mar. 2, 1999

[54] ELEMENT EXCHANGE TYPE FILTER

[75] Inventors: Kazuki Matsubara, Kariya; Masahiro Tomita; Sadahito Fukumori, both of Obu, all of Japan

[73] Assignee: Denso Corporation, Kariya, Japan

[21] Appl. No.: 773,035

[22] Filed: Dec. 24, 1996

[30] Foreign Application Priority Data

Dec. 27, 1995 [JP] Japan ................... 7-340151
Oct. 29, 1996 [JP] Japan ................... 8-286928

[51] Int. Cl.$^6$ .................................. B01D 35/30
[52] U.S. Cl. .................... 210/443; 210/450; 210/453; 210/DIG. 17
[58] Field of Search ..................... 210/232, 440, 210/443, 444, 450, 453, DIG. 17; 220/297, 300, 301

[56] References Cited

U.S. PATENT DOCUMENTS 3,640,390  2/1972  Goy et al. ...................... 210/443
5,114,572  5/1992  Hunter et al. ................... 210/232

FOREIGN PATENT DOCUMENTS

0607563 A2   7/1994   European Pat. Off. .
6-85007      of 0000  Japan .
60-140606    of 0000  Japan .
1296051     11/1972   United Kingdom ........... 210/444
2137000      9/1984   United Kingdom .
WO 93/14858  8/1993   WIPO .

OTHER PUBLICATIONS

Morishita, "Oil Filter", Journal of Nippondenso Technical Disclosure, No. 102–008 of May 15, 1995.

*Primary Examiner*—Matthew O. Savage
*Attorney, Agent, or Firm*—Nixon & Vanderhye P.C.

[57] ABSTRACT

An engine oil filter has an upper cap and a lower case or plate, which are engageable with each other through a projecting portion and a groove portion. In one mode, the projecting portion is inserted into a first longitudinal groove wall and moved along a contact surface of a first skewed groove wall, whereby the cap and the case are moved and fitted together in an axial direction. As axial movement caused by relative rotation between the cap and the case takes place, an O-ring is tightly fitted therebetween at a fixed seal position. This engagement process applies no excessive force to the O-ring so that a sealed state of high reliability is provided.

16 Claims, 10 Drawing Sheets

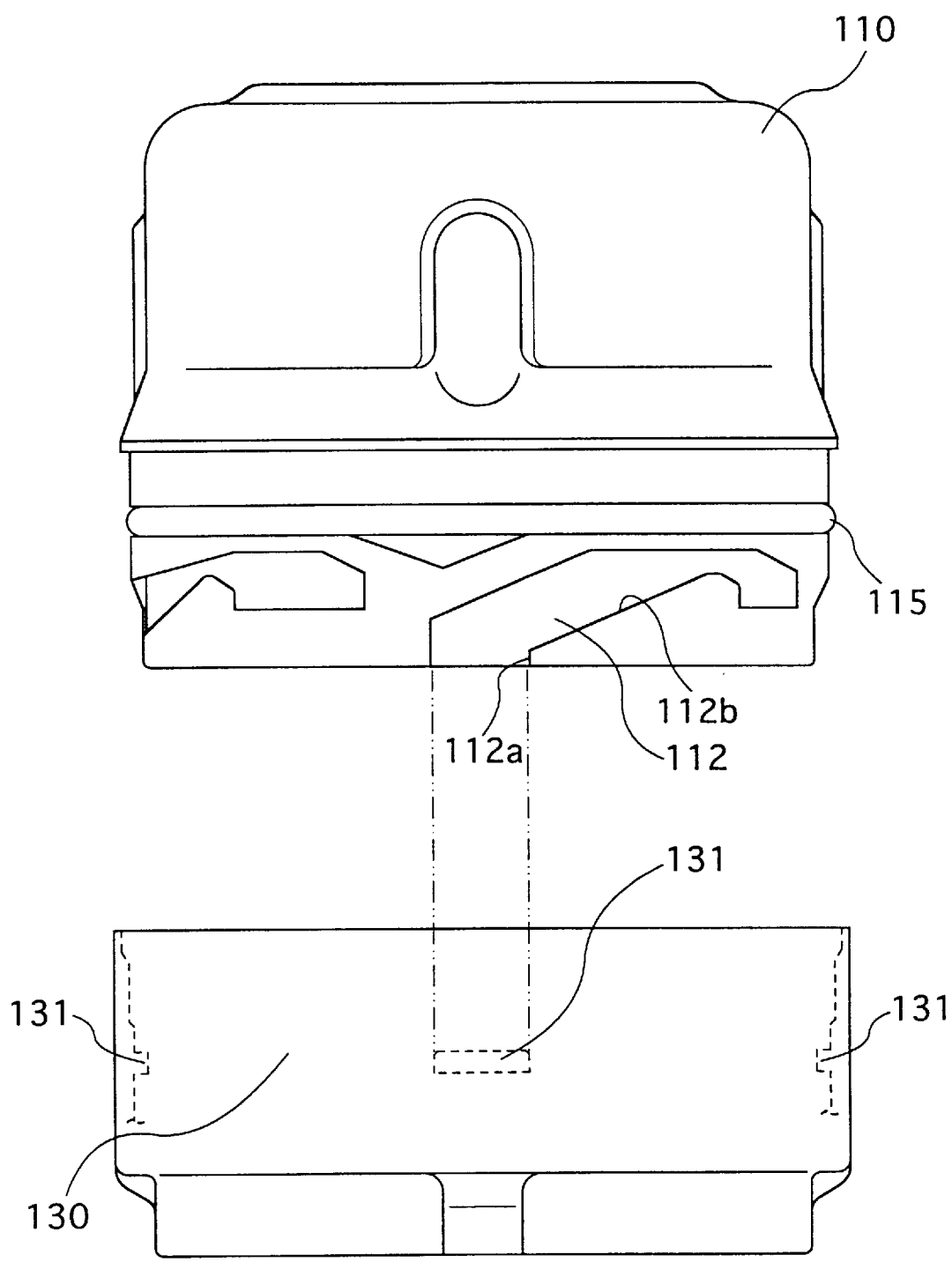

ELEMENT EXCHANGE TYPE FILTER

BACKGROUND OF THE INVENTION

1. Field of the Invention

The present invention relates to a filter using an exchangeable filter element. The filter can be used as a spin-on oil filter for, for example, filtrating impurities or the like mixed in lubrication oil for an internal combustion engine.

2. Description of Related Art

An exchangeable element type filter heretofore known is disclosed in Japanese Utility Model Application Laid-Open Publication No. 6-85007. In this filter construction, a filter casing is divided into two sections, and a projecting portion (an engaging projection) on one side is inserted into a groove portion (an engaging groove) on the other side so that rotation thereof causes connection of the casing to provide an assembly.

The aforementioned filter construction comprises a longitudinal groove having an axial direction aligned with the inserting direction and a subsequent lateral rotational direction at a right angle to the axial direction. An O-ring as a seal member is disposed on the removable portion, and an excessive force is applied to the O-ring when the casing parts are taken apart or connected. Accordingly, there is a disadvantage because since the O-ring is hard to be inserted and tends to be twisted, its sealing property is impaired, and the operating characteristics are not good.

Further, there is another disadvantage because in this filter construction, the engaging projection and grove shapes are easily moved in a rotational direction and in an axial direction after being mounted on the vehicle, and thus the casing becomes loosened and tends to be disengaged.

SUMMARY OF THE INVENTION

It is an object of the present invention to provide an exchangeable element type filter in which it is easy to mount a filter element in the casing, is positive in the casing connection relationship, is high in reliability and can provide very good sealing.

According to a first aspect of the present invention, two casing portions are formed with a pair of restrained members and a pair of guide members, the guide members having a skew guide portion. Both casing portions are relatively rotatable and gradually movable in an axial direction so that both casing portions are fitted in and disengaged from each other. Thereby, both casing portions are gradually moved in an axial direction using the skew guide portion as guide members to assume a fixed restrained position as restrained members, improving the assembly of both casing portions.

According to an alternative of the first aspect of the present invention, a casing comprising two casing portions is dividable, into which is encased a filter element assembly having an exchangeable filter element, between which is interposed a seal member. Both casing portions are formed with a pair of restrained members and a pair of guide members, the guide members having a skew guide portion, the casing portions being relatively rotatable and gradually movable in an axial direction so that said both casing portions are fitted in and disengaged from each other. Thereby, both casing portions are gradually moved in an axial direction using the skew guide portion as guide members to assume a fixed restrained position as restrained members.

According to a second aspect of the present invention, a projection provided on one of casings comprising two bodies encasing a filter element assembly therein passes through a first longitudinal groove portion and a second longitudinal groove portion which comprise the other series of groove portions and reaches a second lateral groove portion as a terminal engaging groove. Thereby, in the element exchange type filter in the assembled state, the connecting state of both casings is not impaired by simple pressing or rotation to prevent it from being carelessly disengaged.

According to an alternative of the second aspect of the present invention, a projection portion provided on one of casings comprising two bodies encasing an element assembly therein passes through a first longitudinal groove portion and second longitudinal groove portion which comprise the other series of groove portions and reaches a second longitudinal groove portion as a terminal engaging groove. When mounting on the internal combustion engine side utilizing a fixing portion provided on one of both casings and when the projection portion is located within the second longitudinal groove portion of a series of grooves, final mounting is obtained in a state where an open edge of one casing interferes with a member on the internal combustion engine side to prevent the projection portion from being returned from the second longitudinal groove portion to the first lateral groove portion. With this construction, the disengagement caused by vibration or shock which it undergoes in the mounting completed state to the internal combustion engine side is prevented in addition to the prevention of the element exchange type filter from disengagement in the assembly completed state.

BRIEF DESCRIPTION OF THE DRAWINGS

Other objects, features and advantages of the present invention will become more apparent from the following detailed description when read with reference to the accompanying drawings, in which:

FIG. 2 is an explanatory view showing the disengaged state of main parts with a connecting relation between a cap and a casing in the oil filter shown in FIG. 1;

DETAILED DESCRIPTION OF PRESENTLY PREFERRED EMBODIMENTS

First Embodiment

Figure 1:
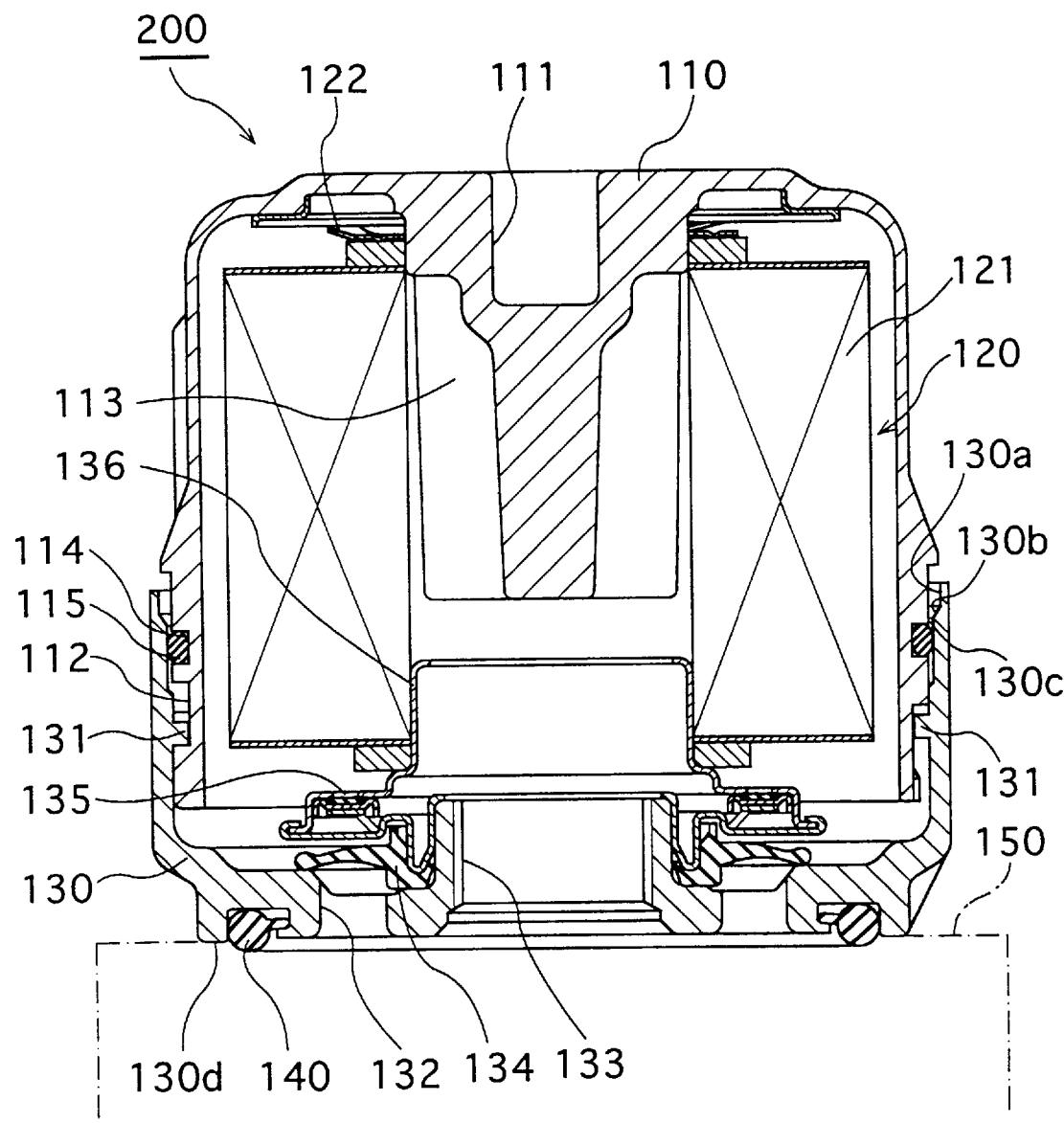
FIG. 1 is a sectional view showing the construction of an oil filter to which is applied an element exchange type filter according to a first embodiment of the present invention.

In FIGS. 1 and 2, reference numeral 200 designates an element exchange type spin-on oil filter (hereinafter merely referred to as "an oil filter") which is attached to an internal combustion engine. In the oil filter 200, a closed-end cylindrical cap 110 formed of aluminum or the like and a case 130 constitute both casing portions, and an O-ring 115 is interposed between the cap 110 and the case 130 to seal a clearance therebetween. The cap 110 is provided at its head top side with a tool hole 111 into which an end of a tool such as a wrench is inserted, and at a cylindrical outer peripheral surface in the vicinity of an opening thereof with a plurality of groove portions 112. The case 130 is provided with a plurality of projecting portions 131 connected to the groove portion 112 of the cap 110 in a cylindrical inner surface in the vicinity of the opening thereof, an oil inlet 132 in the inner periphery thereof, and an oil outlet 133 as an internal thread portion for fixing the oil filter in the center thereof. The case 130 is further formed at an inner surface side of an opening edge thereof with an insert surface 130a, a taper surface 130b, a seal surface 130c in this order from the opening edge so as to oppose the O-ring 115 held on a mounting portion 114 of the cap 110. The case 130 is formed with a circular projection 130d at the bottom thereof.

The insert surface 130a has an inside diameter substantially equal to an outer shape of the O-ring 115 to a degree so as not to interfere with the O-ring 115 too much. The seal surface 130c has an inside diameter smaller than an outside diameter of the O-ring 115 to compress the O-ring 115. The taper surface 130b smoothly joins the insert surface 130a to the seal surface 130c.

The cap 110 is internally provided with a protector 113 which is projected integrally from the head top side and provided with a longitudinal clearance through which oil passes. To the peripheral surface of the protector 113 is mounted a cylindrical element assembly 120 formed from a filter element 121 or the like formed by bending a filter medium, which is pressed by a presser spring 122 against the case 130. The element assembly 120 will be hereinafter referred to as "an element S/A (Sub-Assembly) 120".

At the oil inlet 132 of the case 130 connected to the cap 110 and on the element S/A 120 side are disposed an anti-drain valve 134 by which oil having passed through the oil inlet 132 flows into the element S/A 120 and oil on the element S/A 120 side does not flow back toward the oil inlet 132 and a relief valve 135 by which when the element S/A 120 becomes clogged, the oil inlet 132 and the oil outlet 133 are bypassed.

The relief valve 135 serves to the anti-drain valve 34 as well and is fitted over the outer periphery of the inner projecting portion of the oil outlet 133 of the case 130. A protector portion 136 is formed at a cylindrical part constituting the relief valve 135, and the element S/A 121 is secured to a fixed position in cooperation with the protector 113 on the cap 110 side. Further, a ring-like gasket 140 made of rubber is mounted in the outer periphery of the oil inlet 132 of the case 130.

The mounting procedure of the oil filter 200 will be described hereinafter with reference to FIGS. 3A and 3B to FIGS. 7A and 7B showing stepwise the connecting state between the groove portion 112 of the cap 110 and the projecting portion 131 of the case 130 along with the fitting state of the O-ring 115 interposed between the cap 110 and the case 130.

Figure 3A:
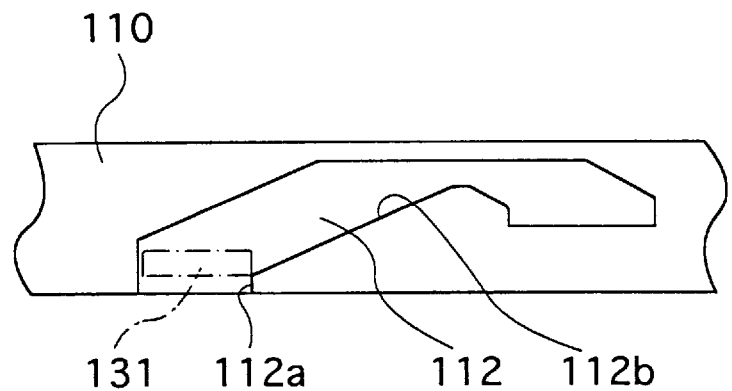
FIGS. 3A and 3B are respectively explanatory views showing a connection relation at the fitting initial stage between a groove portion of a cap and a projecting portion of a casing in the oil filter shown in FIG. 1.

First, the presser spring 122 and the element S/A 120 are inserted in the outer periphery of the projector 113 projecting into the cap 110 of the oil filter 200. A first longitudinal groove wall 112a of the groove portion 112 of the cap 110 is adjusted in position to the projecting portion 131 of the case 130, and at the same time, an open end of the element S/A 120 on the cap 110 side is adjusted to the protector portion 136 of the relief valve 135 on the case 130 side whereby the cap 110 is inserted in the case 130 side to start connecting step (FIG. 3A). In the insertion and connecting steps, both the case 130 and the cap 110 are turned or rotated, while pressing them against each other or after pressing at the initial stage of fitting, to bring the groove portion 112 into engagement with the projecting portion 131, and finally, they are operated to assume a restrained position. At this time, the case 130 and the cap 110 are connected while compressing the presser spring 122, and the element S/A 120 is fixed.

Figure 3B:
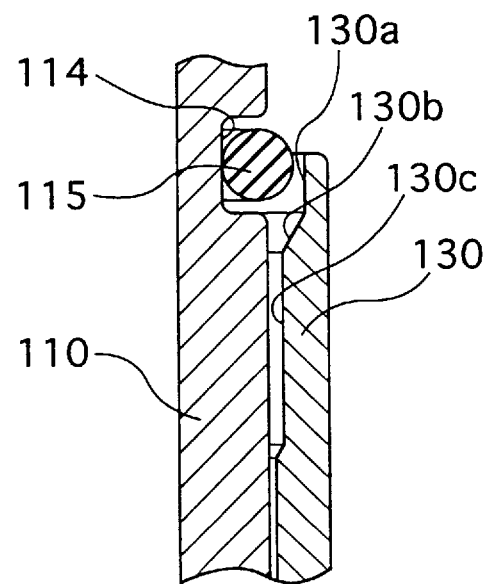

At this time, as shown in FIG. 3B, the O-ring 115 provided on the cap 110 side is opposed to the insert surface 130a of the case 130 having the inside diameter not to contact the outer periphery of the O-ring 115 and is not greatly deformed. That is, in a region where the projecting portion 131 of the case 130 is fitted in the first longitudinal groove wall 112a of the groove portion 112 of the cap 110, the O-ring 115 is not engaged with the taper surface 130b of the case 130. Accordingly, in this region, when the cap 110 is fitted in the case 130, no great force is required.

Figure 4A:
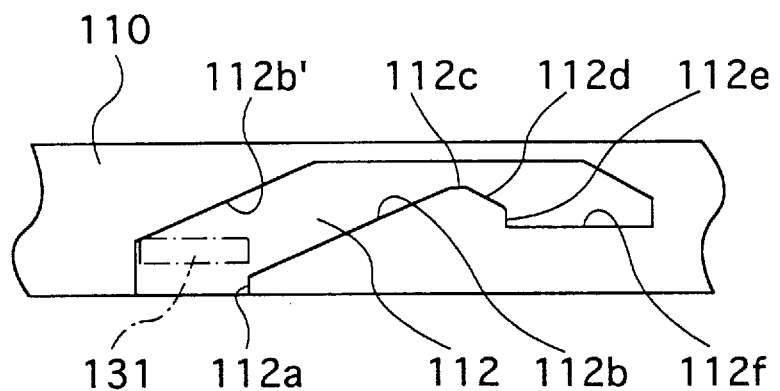
FIGS. 4A and 4B are respectively explanatory views showing a connection relation between a groove portion of a cap and a projecting portion of a casing following FIGS. 3A and 3B.
Figure 4B:
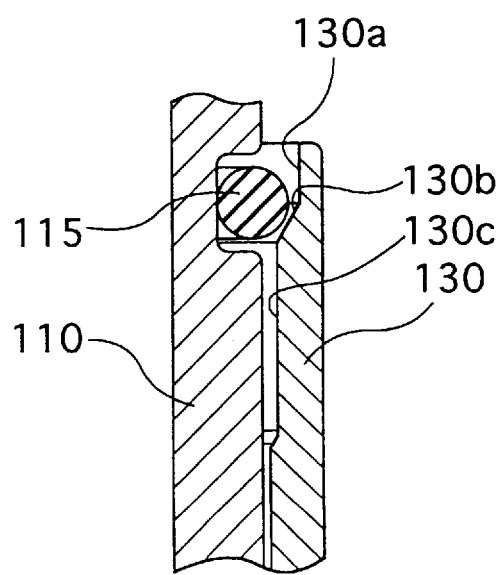

Next, when the cap 110 is further inserted into the case 130, as shown in FIG. 4A, the projecting portion 131 of the case 130 passes through the first longitudinal groove wall 112a of the groove portion 112 of the cap 110 and reaches an opposed wall 112b' of the first skew groove wall 112b. That is, since the projecting portion 131 comes in contact with the opposed wall 112b', the cap 110 is not forcibly pressed in an axial direction of the case 130. Also, at this time, as shown in FIG. 4B, the O-ring 115 provided on the cap 110 side is at the insert surface 130a of the case 130 and is immediately before the engagement with the taper surface 130b. Accordingly, also in this region, when the cap 110 is fitted in the case 130, a great force is not yet required.

Figure 5A:
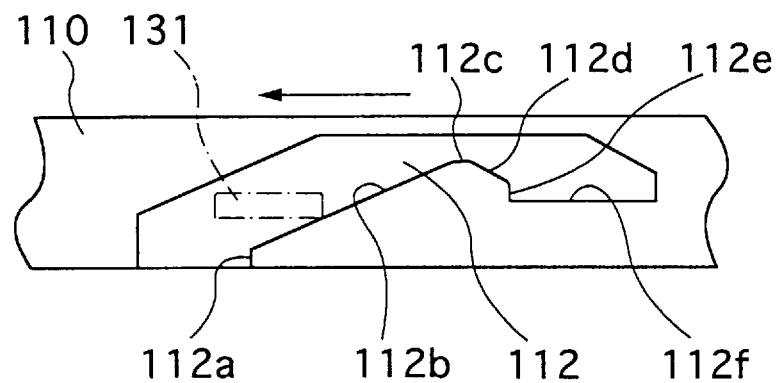
FIGS. 5A and 5B are respectively explanatory views showing a connection relation between a groove portion of a cap and a projecting portion of a casing following FIGS. 4A and 4B.
Figure 5B:
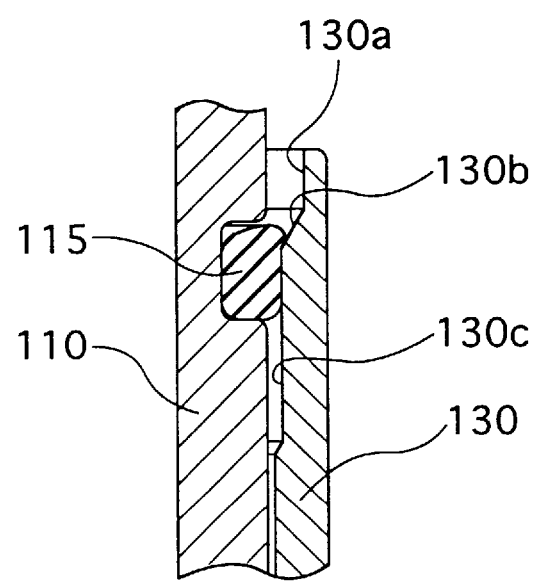

Then, the cap 110 is rotated clockwise (in a direction indicated by arrow in FIG. 5A) while being pressed toward the case 130 whereby the projecting portion 131 of the case 130 moves from the first longitudinal groove wall 112a of the groove portion 112 of the cap 110 to the first skew groove wall 112b of the skew groove (FIG. 5A). Then, since the first skew groove wall 112b of the cap 110 is pressed against the projecting portion 131 of the case 130 by the resilient force of the presser spring 122, the operating force for pressering the cap 110 toward the case 130 may be released. Thereby, in the state where the projecting portion 131 is in contact with the skew groove wall 112b, the cap 110 and the case 130 are merely rotated relatively clockwise so that the projecting portion 131 moves along the first skew groove wall 112b and the cap 110 is moved in a direction to be fitted in the case 130. At this time, as shown in FIG. 5B, the O-ring 115 provided on the cap 110 side gradually passes through, while sliding the taper surface 130b in a rotational direction and in an axial direction from the insert surface 130a of the case 130 to reach the seal surface 130c so as to deform the O-ring 114 to place the latter in a sealed state. Moreover, this movement of the O-ring 115 is smooth because such a movement carries out with the relative rotation between the O-ring 115 and the case 130.

Figure 6A:
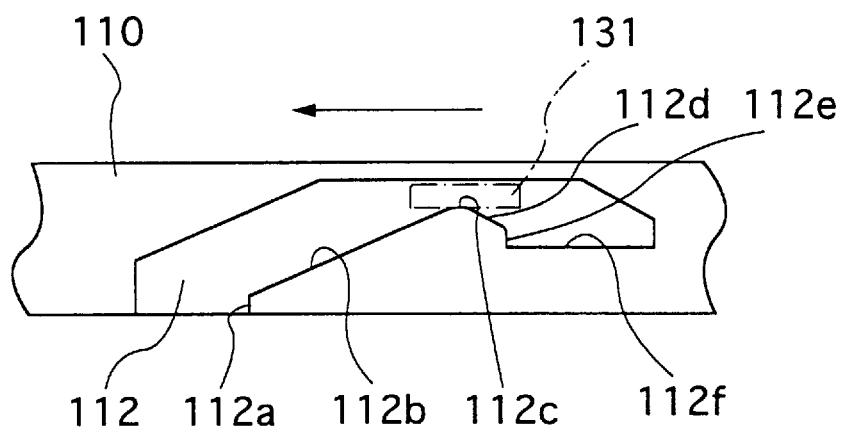
FIGS. 6A and 6B are respectively explanatory views showing a connection relation between a groove portion of a cap and a projecting portion of a casing following FIGS. 5A and 5B.
Figure 6B:
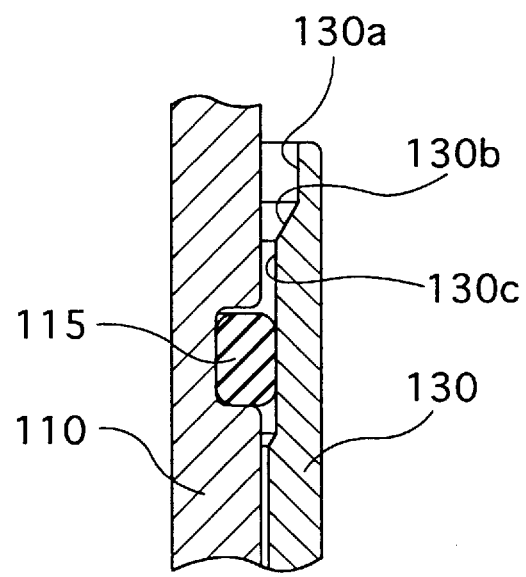

The projecting portion 131 passes through the first lateral groove wall 112c of the groove portion 112 (FIG. 6A). At this time, the O-ring 115 provided on the cap 110 side is completely at the seal surface 130c (FIG. 6B).

Figure 7A:
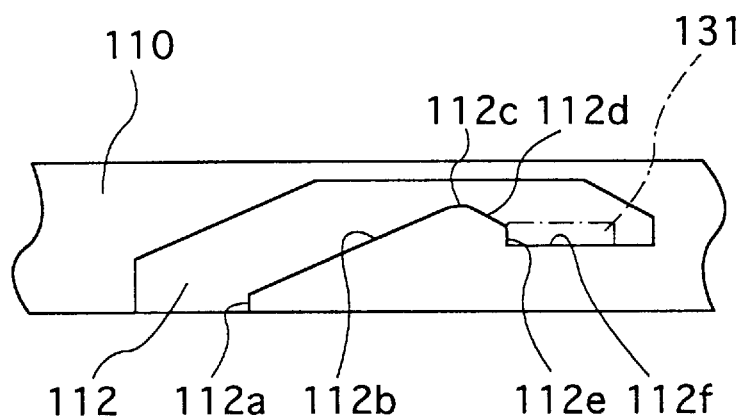
FIGS. 7A and 7B are respectively explanatory views showing a connection relation between a groove portion of a cap and a projecting portion of a casing following FIGS. 6A and 6B.
Figure 7B:
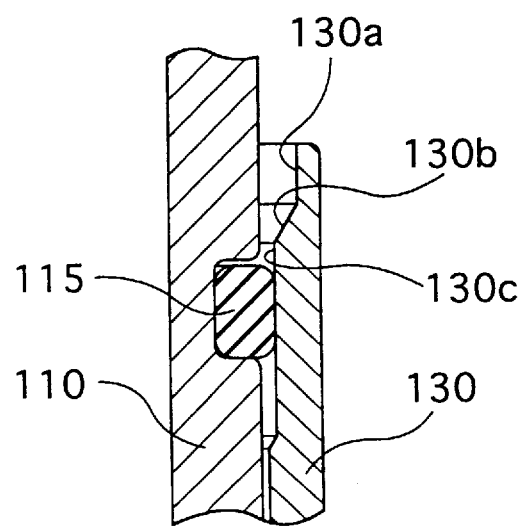

Further, when the cap 110 and the case 130 are rotated, the projecting portion 131 somewhat returns axially while rotating and sliding along the second skew groove wall 112d of the groove portion 112 and reaches the second longitudinal groove wall 112e of the groove portion 112. Finally, the projecting portion 131 reaches the second lateral groove wall 112f and somewhat moves only axially into contact with the end surface (FIG. 7A). This state is an assembly completed state of the cap 110 and the case 130 of the oil filter 200. In this instance, the O-ring 115 provided on the cap 110 side is at the seal surface 130c of the case 130 and the cap 110 and the case 130 are placed in a completely sealed state through the O-ring 115 (FIG. 7B).

When the oil filter 200 is in an assembly completed state, even if the case 110 side is rotated with respect to the case 130, the projecting portion 131 is merely moved in a peripheral direction within the second lateral groove wall 112f since the urging force of the presser spring 122 is exerted (FIG. 7A). Since in this state, the projecting portion 131 is not easily moved beyond the second longitudinal groove wall 112e, the cap 110 is prevented from being separated from the case 130 carelessly.

A description will be made hereinafter of the procedure for mounting the oil filter 200, which has been assembled as above, on the internal combustion engine making use of an external thread portion (not shown) of an oil inlet provided on the mounting seat 150 of the cylinder block of the internal combustion engine.

An oil outlet 133 having an internal thread portion of the case 130 is opposed to the external thread portion of the internal combustion engine. When the cap 110 is rotated clockwise, the internal thread portion of the oil outlet 133 of the case 130 is threadedly engaged with the external thread portion on the mounting seat 150 of the cylinder block of the internal combustion engine. In this final stage, the internal thread portion of the oil outlet 133 of the case 130 is drawn toward the external thread portion on the internal combustion engine side, and the gasket 140 of the oil filter 200 is urged against the mounting seat 150. At this time, a tool such as a wrench or the like not shown may be used to engage the tool hole 111 provided at the head top side of the cap 110 of the oil filter 200.

At this time, a sealing property between the oil filter 200 (gasket 140) and the mounting seat 150 is secured with the elastic deformation of the gasket 140. Further, the projection 130d (open edge) of the case 130 is placed in contact with the mounting seat 150 of the internal combustion engine. Even if an attempt is made to remove only the cap 110 from the case 130, in this state, the connecting relation between the cap 110 and the case 130 cannot be easily released by mere rotation of the cap 110 because the second longitudinal or axial groove wall 112e is in contact with the projecting portion 131.

A description will be made hereinafter of the procedure for exchanging the element S/A 120 by removing only the cap 110 without removing the entire oil filter 200 from the mounting seat 150 of the internal combustion engine.

Conversely to the mounting of the cap 110 on the case 130 of the oil filter 200, the cap 110 is urged against the case 130 and rotated counterclockwise so that the projecting portion 131 of the case 130 passes through a series of groove portions 112 of the cap 110 whereby the cap 110 is separated from the case 130 so that oil staying therein is discharged and the element S/A 120 is removed. After the new element S/A 120 has been encased into the cap 110, the cap 110 is connected to the case 130 in the procedure reversed to that as described to complete an assembly of the oil filter 200. When any damage occurs simultaneously with the exchange of the element S/A 120, oil leaks. Thus, the O-ring 115 is removed from the cap 110 for exchange.

As described above, in the exchange of the element, one element S/A 120 and one O-ring 115 need merely be replaced, and all other constituent parts can be reused.

A description will be made hereinafter of the procedure for removing the entire oil filter 200 from the mounting seat 150 of the internal combustion engine to replace the element S/A 120.

When the oil filter 200 is rotated counterclockwise reversed to that of mounting, the engagement between the internal thread portion of the oil outlet 133 of the case 130 and the external thread portion of the oil inlet of the mounting seat 150 of the internal combustion engine is released so that the entire oil filter 200 shown in FIG. 1 is removed. At this time, the projecting portion 131 comes in contact with the second longitudinal groove wall 112e so that the cap 110 is rotated along with the case 130. At this time, similar to that of mounting the oil filter 200, a tool such as a wrench or the like not shown may be fitted to the tool hole 111 provided in the head top side of the cap 110 of the oil filter 200 for rotation thereof.

The element S/A 120 is replaced, after the entire oil filter 200 has been removed from the engine, in the procedure as follows. When the cap 110 is urged and rotated counterclockwise so that the projecting portion 131 of the case 130 passes through a series of groove portions 112 of the cap 110, the cap 110 is separated from the case 130 so that oil staying therein is discharged and the element S/A 120 is removed. After the new element S/A 120 is encased into the cap 110, the cap 110 is connected to the case 130 in the procedure reversed to that as described to complete an assembly of the oil filter 200. When any damage occurs simultaneously with the exchange of the element S/A 120, oil leaks. Thus, the O-ring 115 and the gasket 140 are removed from the cap 110 and the case 130, respectively, for exchange.

As described above, in the exchange of the element, one element S/A 120, one O-ring 115 and one gasket 140 need merely be replaced, and all other constituent parts can be reused.

Further, the casing of the element exchange type filter according to the present embodiment is divided into the cap 110 as the first casing portion and the case 130 as the second casing portion, into which the element S/A 120 having the filter element 121 is exchangeably encased. Both the casing portions are formed with the groove portion 112 and the projecting portion 131 as a pair of restraint members for restraining both the casings when both the casing portions are made to assume a fixed restraint position and the groove portion 112 and the projecting portion 131 as a pair of guide members for guiding both the casing portions toward the restraint position, said guide members having the first skew groove wall 112*b* as a skew guide portion for gradually moving both the casing portions as both the casing portions relatively rotate.

Accordingly, the cap 110 and the case 130 make use of the groove portion 112 and the projecting portion 131 to achieve both functions of the pair of restraint means and the pair of guide means. The first skew groove wall 112*b* as the skew guide wall is used to gradually move the cap 110 and the case 130 axially through the relative rotation to assume a fixed restraint position, thus enabling the mounting of the cap 110 and the case 130 with good workability.

The cap 110 and the case 130 encase therein the presser spring 122 as an urging member for urging them in a direction of axially disengaging them from each other. Accordingly, in the fitting/disengagement of the cap 110 and the case 130, it is possible to hold the projecting portion 131 in the stopped state along the first skew groove wall 112*b* which is the skew guide portion as the guide means. The cap 110 and the case 130 are merely rotated without applying the force for axially pressing the cap 110 and the case 130 whereby the projecting portion 131 can be positively moved to a fixed restraint position as the restraint means. For this reason, the assembling of the cap 110 and the case 130 can be done with good workability, and the assembling reliance can be enhanced.

The O-ring 115 is interposed between the cap 110 and the case 130. Accordingly, the cap 110 and the case 130 are fitted/disengaged with the O-ring 115 as the seal member interposed. However, since the cap 110 and the case 130 are fitted/disengaged while being rotated, the O-ring 115 as the seal member can be smoothly moved, thus improving the assembling reliance.

Further, in the present embodiment, the projecting portion 131 is gradually moved axially and circumferentially via the first skew groove wall 112*b* which is the skew groove as the skew guide portion from the first longitudinal groove wall 112*a* as the inlet portion and arrives at the second lateral groove wall 112*f* as the retainer for being connected. Since the groove portions 112 are formed in series, the fitting/ disengagement of the projecting portion 131 with respect to the groove portion 112 is smoothly achieved, and the assembling of the cap 110 and the case 130 can be accomplished with good workability.

In the present embodiment, the first skew groove wall 112*b* as the skew guide wall in the skew guide portion is provided, and the first skew groove wall 112*b* is provided reversely facing to the opening of the cap 10 as the other casing portion. Accordingly, the projecting portion 131 is made along the first skew groove wall 112*b* with respect to the opening surface whereby the cap 110 and the case 130 can be axially fitted/disengaged from each other making use of the axial displaced shape of the first skew groove wall 112*b*.

It is important that the first skew groove wall 112*b* as the skew guide wall be formed to extend axially and circumferentially toward the top head side from the first longitudinal groove wall 112*a* as the inlet portion of the cap as the other casing portion. Therefore, the projecting portion 131 is made along the first skew groove wall 112*b* whereby the cap 110 can be fitted in the case 130 toward the top head side of the cap 110 and can be disengaged axially circumferentially toward the the axial deep side conversely.

Further, the cap 110 as one casing portion is formed with the mounting portion 114 for holding the O-ring 115 as the seal member, the case 130 as the other casing portion is formed with the seal surface 130*c* in press-contact with the O-ring 115 and the taper surface 130*b* positioned on the opening side from the seal surface 130*c*. Accordingly, in fitting the cap 110 and the case 130, the O-ring 115 can be gradually placed in press-contact with the seal surface 130*c* from the taper surface 130*b*.

A boundary portion between the seal surface 130*c* and the taper surface 130*b* is positioned within the guide range of the projecting portion 131 by the first skew groove wall 112*b* as the skew guide wall. Accordingly, the cap 110 is formed with the mounting portion 114 for holding the O-ring 115, and the case 130 is formed with the seal surface 130*c* in press-contact with the O-ring 115 as the seal member and the taper surface 130*b* positioned on the opening side from the seal surface 130*c*. A boundary portion 130*b* between the seal surface 130*c* and the taper surface 130*b* is positioned within the guide range of the projecting portion 131 by the first skew groove wall 112*b*. Therefore, the O-ring 115 can be gradually placed in press-contact with the seal surface 130*c* from the taper surface 130*b* making use of the axial guide by the first skew groove wall 112*b*, and the cap 110 and the case 130 can be smoothly fitted even the interposition of the O-ring 115.

The second lateral groove wall 112*f* as the retainer is formed with the second longitudinal groove wall 112*e* as a controlling wall surface for controlling the movement of the projecting portion 131 in the rotational direction which is on the connection releasing side. Thereby, the cap 110 and the case 130 are connected, and after the projecting portion 131 is positioned at the second lateral groove wall 112*f*, they are prevented from careless disengagement from each other.

Further, the oil filter 200 as the element exchange type filter comprises a casing which can be divided into the cap 110 and the case 130 as the first casing portion and the second casing portion, respectively, the element S/A 120 having a filter element 121 exchangeably encased in both the casing portions, and the O-ring 115 as the seal member interposed between both the casing portions. Both the casing portions are formed with the groove 112 and the projecting portion 131 as a pair of restraint members for restraining both the casing portions, and the groove portion 112 and the projecting portion 131 as a pair of guide members for guiding both the casing portions, said guide means having the first skew groove wall 112*b* as the skew guide portion for gradually axially moving both the casing portions as both the casing portions relatively rotate.

Accordingly, the casing comprising the cap 110 and the case 130 as two casing portions is constituted to be divided, in which the element S/A 120 having the filter element 121 is exchangeably encased, between which is interposed the O-ring 115 as the seal member, the cap 110 and the casing 130 being formed with the groove portion 112 and the projecting portion 131 serving as a pair of restraint members and a pair of guide members, the guide means having the first skew groove wall 112*b* as the skew guide portion, the cap 110 and the case 130 being gradually axially moved by the relative rotation thereof so that the cap 110 and the case 130 are fitted/disengaged from each other. Thereby, the cap 110 and the case 130 can be gradually axially moved using the first skew groove wall 112*b* to assume a fixed restraint position as restraint members, thus providing the oil filter 200 which is excellent in the assembling workability of the cap 110 and the case 130.

The oil filter 200 as the element exchange type filter according to the present embodiment is further provided with the presser spring 22 as the urging means which is interposed between the cap 110 and the case 130 as both casing portions and for urging both the casing portions in a direction of axially disengaging them from each other through the element S/A 120.

Accordingly, the presser spring 122 is interposed between the cap 110 and the case 130 through the element S/A 120 in a direction of axially disengaging them from each other. Thereby, in the fitting/disengagement of the cap 110 and the case 130, they can be positively positioned at the second lateral groove wall 112f which is a fixed restraint position as restraint members along the first skew groove wall 112b through the element S/A 120, thus enabling the assembling of the cap 110 and the case 130 with good workability and providing the oil filter 200 with improved assembling reliability.

Further, in the oil filter 200 as the element exchange type filter according to the present embodiment, the seal member comprises an O-ring 115 held on the cap 110 as either of both casing portions.

Accordingly, the O-ring 115 as the seal member is held on the cap 110. Thereby, the cap 110 and the case 130 can be positively connected through the O-ring 115, thus providing the oil filter 200 having the improved reliability of the assembling of the cap 110 and the case 130.

In the above-described embodiment, an inclination of the axial distance with respect to a rotational angle of the first skew groove wall 112b is made smaller than an inclination of the second skew groove wall 112d and the projecting portion 131 arrives at the holding portion, an appropriate feeling of moderation can be obtained so that an operator tends to feel that the cap 110 and the casing 130 are positively connected.

As described above, the oil filter 200 according to the above-described embodiment is compatible with the conventional spin-on type oil filter, and can be exchanged as necessary. In place of such a construction as described above, a construction can be employed in which the case 130 is provided directly on the internal combustion engine, and only the cap 110 is removed when element is exchanged.

While in the above-described embodiment, the groove portion 112 formed in the outer periphery of the cap 110 is connected with the projecting portion 131 projecting from the inner wall of the case 130, it is to be noted that in place of the aforementioned construction, the projecting portion and the groove portion may be provided on the cap side and the case side, respectively. Further, the groove portion need not be a groove having a bottom surface but may be formed as an extending-through slit-like groove which starts from the axial bottom edge of the case. Furthermore, the groove portion may have at least one holding portion as restraint member for restraint when the relative position to the projecting portion assumes a fixed restraint position. The groove portion is not controlled in the rotational direction with the projecting portion but the projecting portion may arrive at the holding portion of the groove portion from the lateral rotational direction. With such a construction as described, a "W" groove may be employed in place of dogleg-shaped groove as in the aforementioned embodiment, and a central portion thereof may comprise the holding portion. In addition, the pair of restraint members and the pair of guide members may be formed making use of not only the projecting portion and the groove portion but also a side wall of a projected portion such that the projecting portion be slidably moved and guided, that is, only one groove wall in the groove portion in the above-described embodiment. In addition, a construction may be employed in which a projected portion having the shape corresponding to the groove portion 112 is provided, and two projecting portions are slidably moved and guided so as to sandwich both walls of the projected portion.

The cap 110 and the case 130 may be formed of resin or the like instead of aluminum. Further, the O-ring 115 may be a sectional shape such as an ellipse or a guitar-shape instead of a circle. Further, the present invention may be applied to an element exchange type fuel filter.

Figure 8:
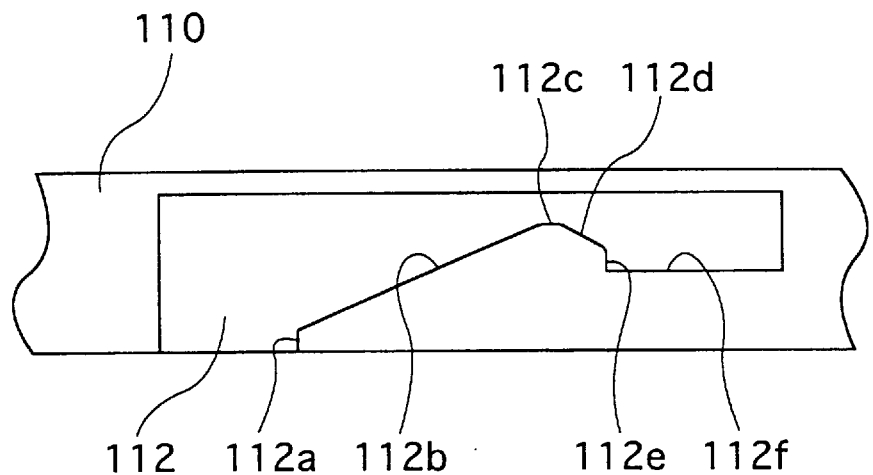
FIG. 8 is a plan view showing a modified example of the groove portion of the cap in the oil filter to which is applied an element exchange type filter according to a first embodiment of the present invention.

Further, as shown in a modification of FIG. 8, a groove portion 112 may be employed from which are removed the opposed surface (112b' in FIG. 4A) of the first skew groove wall 112b and the opposed surface of the second skew groove wall 112d. In this case, it is contemplated that when the cap 110 and the case 130 are excessively pressed, the O-ring is somewhat forced, but if a sufficient response is imparted to an operator by means of a spring 122 to urge a projecting portion 131 to slide along the first skew groove wall 112b, the workability similar to that of the aforementioned embodiment can be obtained.

Figure 9:
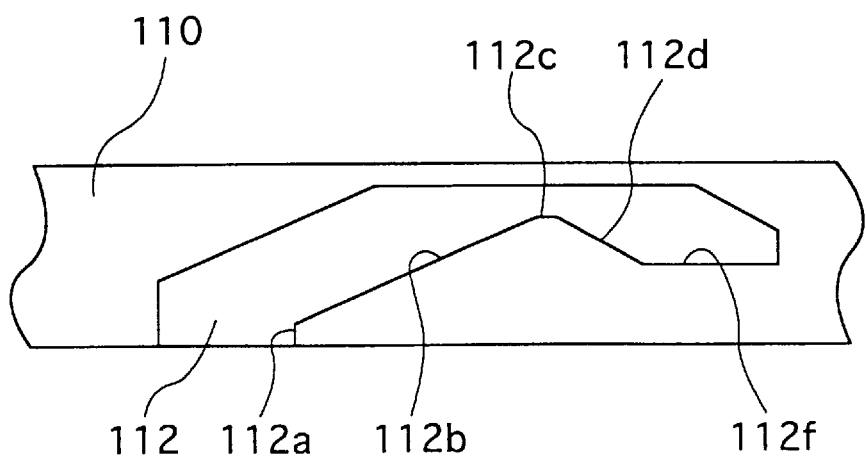
FIG. 9 is a plan view showing a further modified example of the groove portion of the cap in the oil filter to which is applied an element exchange type filter according to a first embodiment of the present invention.

Furthermore, as in another modification shown in FIG. 9, a second skew groove wall 112d is extended to a second lateral groove wall 112f while the second longitudinal groove wall 112e in the first embodiment may be removed. In this case, when the connecting state of the fitted projecting portion is released, the cap 110 and the case 130 can be smoothly removed because no catch portion in a rotational direction is present. Further, there can be provided, as necessary, a clip or a pin as a movable locking member for preventing the cap 110 and the case 130 from axial separating displacement.

Second Embodiment

Figure 10:
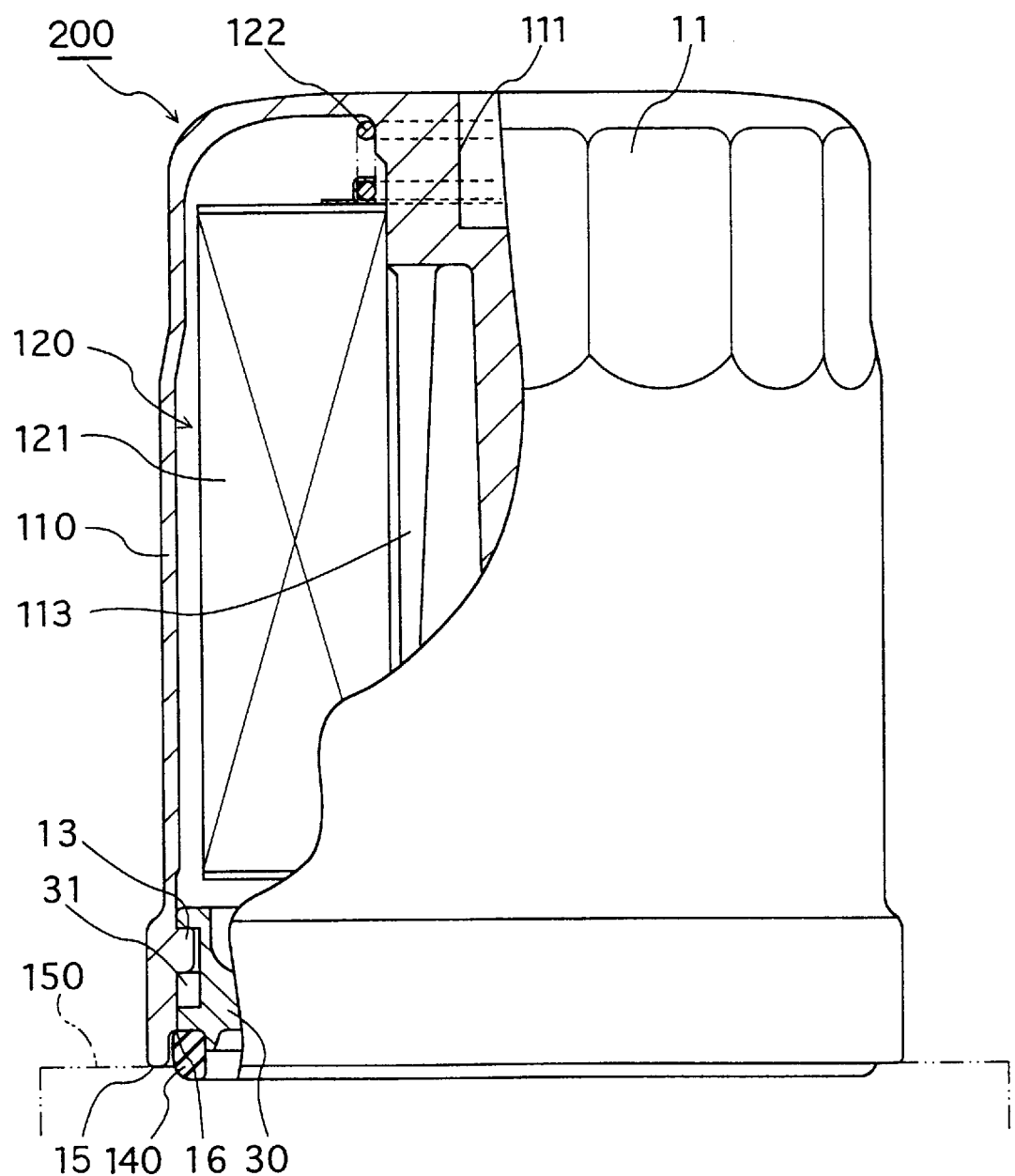
FIG. 10 is a partial sectional view showing the construction of an element exchange type spin-on oil filter to which is applied an element exchange type filter according to a second embodiment of the present invention.
Figure 11:
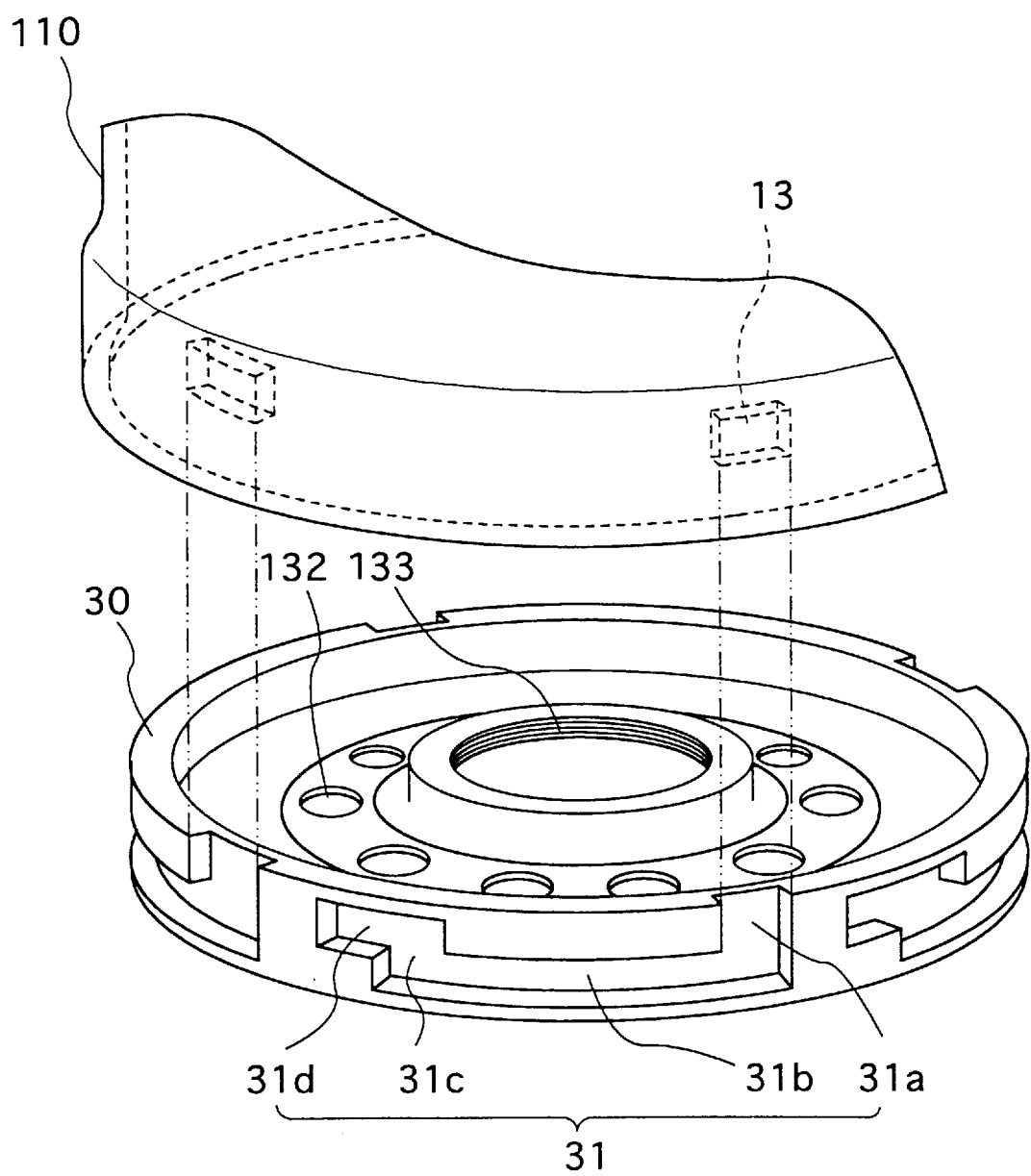
FIG. 11 is an exploded perspective view showing the construction of main parts shown in FIG. 10.

In FIGS. 10 and 11, an element exchange type spin-on oil filter (hereinafter merely referred to as "an oil filter") 200 comprises a closed-end cylindrical cap 110 formed of aluminum or the like and a substantially disk-like plate 30 likewise formed of aluminum, which are engaged with each other to provide an integral configuration. The cap 110 is provided with a polygonal portion 1 on the outer peripheral surface of which is mounted a filter mounting and removing tool is mounted, a tool hole 111 into the head top side of which is inserted a hexagonal wrench or the like is inserted, and a plurality of projecting portions 131 on the cylindrical inner surface in the vicinity of an opening thereof. The plate 30 is provided with a groove portion 31 in engagement with the projecting portion 13 of the cap in its most outer peripheral circumferential edge, and an oil inlet 132 in its inner periphery, and a filter fixing internal thread portion of an oil outlet 133 in its central portion.

An element assembly 120 formed of filter element 121 or the like formed by bending a filer medium on the peripheral surface of a protector 14 projected substantially cylindrically integrally from the head top side and provided with a plurality of longitudinal clearances through which oil passes is mounted within the cap 110 and pressed against toward the plate 30 by means of a presser spring 122. The element assembly 120 will be hereinafter referred to as "an element S/A (Sub-Assembly")".

At the end of oil inlet 132 of the plate 30 engaged with the cap 110 and on the element S/A 120 side are disposed an anti-drain valve (not shown in the figure) to allow a free flow of oil having passed through the oil inlet 132 toward the element S/A 120 and to prevent oil on the element S/A 120 side from flowing back toward the oil inlet 132 and a relief valve (not shown in the figure) to allow bypass the oil inlet 132 and the oil outlet 133 when the element S/A 120 becomes clogged.

A ring-like gasket 140 made of rubber is mounted between the outer periphery of the oil inlet 132 of the plate 30 and the cylindrical inner surface of the cap 110. This gasket 140 is so formed that a part thereof covers an engaging portion between the projecting portion 13 of the cap 110 and the groove portion 31 of the plate 30 as it undergoes elastic deformation.

The procedure for assembling the oil filter 200 will be described hereinafter.

First, the presser spring 122 and the element S/A 120 are inserted into the outer periphery of the protector 113 projecting into the cap 110 of the oil filter 200. A first longitudinal groove portion 31a of the groove portion 31 of the plate 30 is adjusted in position to the projecting portion 13 of the cap 110, and the plate 30 is inserted into the cap 110 while urging the presser spring 122. When the plate 30 is rotated clockwise, and the projecting portion 13 of the cap 110 reaches a first lateral groove 31b of the groove portion 31. When the projecting portion 13 of the cap 110 reaches a second longitudinal groove portion 31c following the first lateral groove portion 31b of the groove portion 31, the plate 30 is moved axially reversed to the insertion by the bias force of the presser spring 122. Further, when the plate 30 is rotated clockwise, the projecting portion 13 of the cap 10 reaches a second lateral groove 31d as an end engaging groove of the groove portion 31, when in contact with the end surface, its rotation stops. This state is an assembly completed state of the oil filter 200.

Accordingly, when the oil filter 200 is in an assembly completed state, even if the cap 110 is rotated with respect to the plate 30, the bias force of the presser spring 122 is exerted so that the projecting portion 13 of the cap 110 is merely moved within the second lateral groove portion 31d out of the groove portion 31 of the plate 30 whereby it is not easily moved from the second longitudinal groove portion 31c toward the first lateral groove portion 31b to prevent the cap 110 and the plate 30 from being disengaged carelessly.

A description will be made hereinafter of the procedure for mounting the oil filter 200 completed in assembly as described above to the internal combustion engine making use of an external thread portion (not shown) of the oil inlet provided in a mounting seat 150 of a cylinder block of the internal combustion engine.

An internal thread portion of the outlet 133 of the plate 30 is opposed to the external thread portion of the internal combustion engine using a filter mounting and removing tool (not shown) or a hexagonal wrench or the like (not shown) with respect to the tool hole 111 provided on the head top side of the cap 110 with respect to the polygonal portion 11 provided on the cylindrical outer periphery of the cap 110 of the oil filter 200. Next, when the cap 110 is rotated clockwise, the internal thread portion of the outlet 133 and the external thread portion of the inlet on the engine side are threadedly engaged with each other. At this final stage, the internal thread portion of the plate 30 is drawn toward the external portion of the internal combustion engine side, and the gasket 140 of the oil filter 200 is pressed against the mounting seat 150.

At this time, a seal state is established between the oil filter 200 (gasket 140) and the mounting seat 150 as the gasket 140 undergoes elastic deformation, and at the same time, the engaging end 16 with the outer circumferential edge of the plate 30 of the cylindrical inner surface in the vicinity of an opening of the cap 110 is placed in sealed state. Further, an open edge or circular projection 15 of the cap 110 is placed in contact with a mounting seat 150 of the internal combustion engine. Even if, in this state, an attempt is made to remove only the cap 110 from the plate 30, the projecting portion 13 of the cap 110 cannot be moved in the direction of the first lateral groove 31b following the second longitudinal groove 31c from the second lateral groove 31d out of the groove 31 of the plate 30. That is, the connecting relation between the cap 110 and the plate 30 is retained unless the internal thread portion of the plate 30 and the external thread portion of the internal combustion engine are loosened.

Next, a description will be made of the procedure for removing the oil filter 200 from the mounting seat 150 of the internal combustion engine to exchange the element S/A 120.

When the cap 110 is rotated counterclockwise conversely to the mounting thereof, using a filter mounting and removing tool not shown with respect to the polygonal portion 11 provided in the cylindrical outer periphery of the cap 110 of the oil filter 200 or a hexagonal wrench or the like with respect to the tool hole 111, the engagement between the internal thread portion of the plate 30 and the external thread portion of the oil inlet of the mounting seat 150 of the internal combustion engine is released so that the entire oil filter 200 shown in FIG. 10 is removed.

After the entire oil filter 200 is removed, the element S/A 120 is exchanged in the procedure as follows. When the projecting portion 13 of the cap 110 is pressed and rotated so as to pass through a series of groove portions 31 of the plate 30, the cap 110 and the plate 30 are separated from each other so that oil staying therein is discharged and the element S/A 120 is removed. After the exchanging element S/A 120 is encased in the cap 110, the cap 110 and the plate 30 are engaged with each other by the procedure reversed to that as described above whereby the assembling of the oil filter 200 is completed. When a damage occurs simultaneously with the exchange of the element S/A 120, oil leaks. Therefore, the gasket 140 is removed from the plate 30 and exchanged.

As described above, when an element is exchange in the oil filter 200 in the present embodiment, it will suffice that one element S/A 120 and one gasket 140 be exchanged, and all other constituent parts can be reused.

As described above, the oil filter 200 as an element exchange type filter in the present embodiment is provided with a casing capable of encasing the element S/A 120 having the filter element 121. The casing comprises the cap 110 and the plate 30 as a first casing and a second casing, respectively. The cap 110 as one of the casings is provided with the projecting portion 13. The plate 30 as the other of the casings is provided with a series of groove portions 31 comprising an axial first longitudinal groove 31a into which is inserted the projecting 13, a first lateral groove 31b in a rotational direction at right angles to the axial direction following the groove 31a, a second longitudinal groove 31c in an axial direction reversed to the insertion following the groove 31b, and a second lateral groove 31d as an end engaging groove in a rotational direction at right angles to the axial direction following the groove 31c, the cap 110 and the plate 30 being engaged with each other through the projecting portion 13 and the groove portions 31.

Accordingly, when the projecting portion 13 of the cap 110 passes through the series of groove portions 31 of the plate 30 and reaches the second lateral groove 31d as an end engaging groove, the assembling is completed. For this reason, in the oil filter 200 in the assembling completed state, the cap 110 and the plate 30 cannot be moved each other in an axial direction for assembly. Therefore, the cap 110 and the plate 20 are prevented from being disengaged carelessly.

The plate 30 as either casing of the casings of the oil filter 200 as an element exchange type filter is provided with the internal thread portion as a fixing portion for being mounted on the internal combustion engine.

Accordingly, the oil filter 200 in the state where the cap 110 and the plate 30 are completed to be assembled is mounted on the internal combustion engine through the internal thread portion of the plate 30. Therefore, this is compatible with the conventional spin-on type oil filter in which a filter element cannot be exchanged with the integral type casing.

In the groove portion 31 provided in the plate 30 as one of the casings of the oil filter 200 as an element exchange type filter, the end direction of the second lateral groove 31d is set in a fastening direction of the internal thread portion as a fixing portion.

That is, the end direction of the second lateral groove 31d of the groove portions 31 of the plate 30 matches the fasting direction of the external thread portion on the engine side. For this reason, when the cap 110 assembled in the plate 30 is gripped and rotated and then mounted on the internal combustion engine, the cap 110 and the plate 30 are prevented from careless disengagement of assembly.

Further, the oil filter 200 as an element exchange type filter according to the present embodiment is provided with casing capable of encasing the element S/A 120 having a filter element 121. The casing comprises the cap 110 and the plate 30 as a first casing and a second casing, respectively. The cap 110 of the casings is provided with the projecting portion 13, and the plate 30 is provided with a series of groove portions 31 comprising the axial first longitudinal groove 31a into which is inserted the projecting portion 13, the first lateral groove 31b in a rotational direction at right angles to the axial direction following the groove 31a, and the second longitudinal groove 31c as the end engaging groove in an axial direction reversed to the insertion following the groove 31b. The plate 30 as the other one of the casings is provided with an internal thread portion as a fixing portion for being mounted on the internal combustion engine. In the case where the projecting portion 13 is mounted on the internal combustion engine by the internal thread portion is positioned within the second longitudinal groove 31c, the projecting portion 13 is prevented from being returned from the second longitudinal groove 31c to the first lateral groove 31b due to the interference between the open edge 15 of the cap 110 as one casing and the mounting seat 150 on the internal combustion engine side.

Accordingly, in the oil filter 200 as described, when the projecting portion 13 of the cap 110 passes through the series of groove portions 31 of the plate 30 and reaches the second longitudinal groove 31c as the end engaging groove, the assembling is completed. When mounted on the internal combustion engine in the assembled state, the open edge 15 of the cap 110 is placed in contact with the mounting seat 150 of the internal combustion engine. Therefore, in the oil filter 200, in the assembled state, the cap 110 and the plate 30 are prevented from careless disengagement, and in the mounted state to the internal combustion engine, the projecting portion 13 of the cap 110 is prevented from being returned from the second longitudinal groove 31c of the plate 30 to the first lateral groove 31b so that the engaging relation therebetween is positively held without being loosened due to the vibration and shock. Thereby, the assembling workability of the oil filter 200 and the reliability of mounting thereof to the internal combustion engine are improved.

The oil filter 200 according to the above-described embodiment is compatible with the conventional spin-on type oil filter, and can be exchanged as necessary, as mentioned above.

While in the above-described embodiment, the projecting portion 13 of the cap 110 is engaged with the second lateral groove 31d of the series of groove portions 31 of the plate 30 to complete assembling, it is to be noted that in carrying out the present embodiment, the arrangement is not limited thereto but spring means or the like may be added to the groove portions 31 of the plate so that the projecting portion 13 of the cap 110 is urged in the end direction of the second lateral grove 31d of the plate 30 and the assembling position of the projecting portion 13 is held with a feeling of moderation.

In order to prevent the cap 110 from movement and vibrations in the state where the oil filter 200 is mounted on the internal combustion engine, it is important that the projecting portion 13 comes in contact with the deepest side of the second longitudinal groove 31c, that is, the groove end in an axial direction reversed to the insertion when assembled so that the cap 110 and the plate 30 are prevented from being further moved in an axial direction, in which state the gasket 140 is compressed so that the open edge 15 of the cap 110 can come in contact with the mounting seat 150. With this cap configuration, the open edge 15 of the cap 110 functions as a stopper for limiting the compression amount of the gasket 140.

However, in order to prevent the projecting portion 13 from being returned from the second longitudinal groove 31c to the first lateral groove 31b, it is important that in the normal fastening state to the mounting seat 150 of the internal combustion engine, the cap 110 as one casing is constituted and positioned to be able to interfere with the mounting seat 150 as a member on the internal combustion engine. A clearance may be formed between the open edge 15 of the cap 110 and the mounting seat 50. In this case, it is important that the axial length of the second longitudinal groove 31c is larger than a clearance which would be formed between the open edge 15 of the cap 110 and the mounting seat 150, and also when the cap 110 is pressed so that the cap 110 interferes with the mounting seat 150, the projecting portion 13 is positioned within the second longitudinal groove 31c.

Alternatively, the plate 30 is formed into a cup-like configuration, a series of groove portions are provided close to an open end thereof, and the projecting portion 13 is provided substantially in the middle of the cylindrical wall portion of the cap 110. It is important that the cap 110 and the plate 30 are connected by a rotational type locking mechanism using a projection and a groove, or an engaging mechanism called a bayonet mechanism. In place of the aforementioned construction, the projecting portion 13 is provided on the plate 30, and the groove portions 31 are provided in the cap 110. Further, each groove need not be a groove having a bottom surface, but an extending-through slit-like groove may be employed. Furthermore, the present invention can be applied to an element exchange type spin-on fuel filter.

The present invention should not be resticted to the disclosed embodiments and modifications thereof but may be varied further without departing from the spirit and the scope of the present invention.

What is claimed is:

1. A casing for an element exchange type filter, said casing comprising:
   a pair of casing portions for exchangeably housing therein an element assembly having a filter element;
   a pair of restraint means for restraining said casing portions at a restraint position when said casing portions are engaged with each other;
   a pair of guide means for guiding engaging movement of said casing portions toward said restraint position, said guide means having a non-through skew guide portion for gradually axially moving said casing portions when said casing portions are relatively rotated for engagement;
   wherein said guide means includes a projecting portion provided on one of said casing portions, and a skew guide wall defining a groove portion thereon as said skew guide portion provided in the other of said casing portions to guide said projecting portion on contact therewith;
      a seal member interposed radially between said casing portions;
      one of said casing portions is formed with a mounting portion for holding an O-ring as said seal member;
      the other of said casing portions is formed with a seal surface for pressing contact with said O-ring, and a taper surface positioned on an opening side from said seal surface so that said O-ring is pressed gradually as said casing portions are moved axially with respect to each other; and
      said taper surface is defined not to press substantially said O-ring radially until said casing portions are moved along said skew guide portion.

2. A casing for an element exchange type filter according to claim 1, further comprising:
   a biasing member interposed between said casing portions to bias said casing portions in a direction of axial disengagement.

3. A casing for an element exchange type filter according to claim 1, wherein:
   said restraint means and said guide means are included in said projecting portion and said groove portion; and
   said groove portion is formed with an inlet portion for receiving said projecting portion thereinto at a start of engagement of said casing portions, a skew groove having said skew guide wall for guiding said projecting portion, and a holding portion as said restraint means.

4. A casing for an element exchange type filter according to claim 3, wherein:
   said skew guide wall extends from said inlet portion of said other of said casing portions axially and circumferentially.

5. A casing for an element exchange type filter according to claim 1, wherein:
   said skew guide wall is provided to face in a reverse direction to an opening of said other of said casing portions.

6. A casing for an element exchange type filter according to claim 1, wherein:
   a boundary portion between said seal surface and said taper surface is positioned within guiding range of said skew guide portion.

7. A casing for an element exchange type filter, said casing comprising;
   a pair of casing portions for exchangeably housing therein an element assembly having a filter element;
   a pair of restraint means for restraining said casing portions at a restraint position when said casing portions are engaged with each other;
   a pair of guide means for guiding engaging movement of said casing portions toward said restraint position, said guide means having a non-through skew guide portion for gradually axially moving said casing portions when said casing portions are relatively rotated for engagement;
   wherein said guide means includes a projecting portion provided on one of said casing portions, and a skew guide wall defining a groove portion thereon as said skew guide portion provided in the other of said casing portions to guide said projecting portion on contact therewith;
      said restraint means and said guide means being included in said projecting portion and said groove portion;
      said groove portion being formed with an inlet portion for receiving said projecting portion thereinto at a start of engagement of said casing portions, a skew groove having said skew guide wall for guiding said projecting portion, and a holding portion as said restraint means; and
      said holding portion is formed with a stepped restraining wall surface continuous from said skew guide wall for restraining movement of said projecting portion in a rotational direction of disengagement of said casing portions.

8. An element exchange type filter comprising:
   a pair of casings capable of housing an element assembly having a filter element when engaged to each other;
   a projecting portion provided on one of said casings; and
   a series of groove portions provided in the other of said casings,
   said groove portions including an axial first longitudinal groove to receive axially said projecting portion at a start of engagement of said casings, a first lateral groove extending in a direction at a right angle to an axial direction following said first longitudinal groove to guide said projecting portion circumferentially, an axial second longitudinal groove following said first lateral groove to guide said projecting portion in an axial direction opposite to the start of engagement, and a second lateral groove as an end engaging groove extending in a circumferential direction at a right angle to an axial direction and following said second lateral groove.

9. An element exchange type filter according to claim 8, said filter further comprising:
   a fixing portion provided in one of said casings for mounting on an internal combustion engine.

10. An element exchange type filter according to claim 9, wherein:
    said second lateral groove extends from said second longitudinal groove in the same direction as a fastening direction of said fixing portion to said engine.

11. An element exchange type filter comprising:
    a pair of casings capable of housing an element assembly having a filter element when engaged with each other;
    a projecting portion provided on one of said casings;
    a series of groove portions provided in the other of said casings, said groove portions including an axial first longitudinal groove to receive axially said projecting portion at a start of engagement of said casings, a first lateral groove extending in a direction at a right angle to an axial direction following said first longitudinal groove to guide said projecting portion circumferentially, an axial second longitudinal groove following said first lateral groove to guide said projecting portion in an axial direction opposite to the start of engagement, and a second lateral groove as an end engaging groove extending in a circumferential direction at a right angle to an axial direction and following said second lateral groove; and a fixing portion provided for mounting said casings on an internal combustion engine side, wherein said groove portions are formed to prevent said projecting portion from returning from said second longitudinal groove to said first lateral groove by an interference between an open edge of said casings and said internal combustion engine side, in the case of fastening said casings to said internal combustion engine side by said fixing portion with said projecting portion being positioned within said second longitudinal groove.

12. A device for an element exchange type filter for an engine having a filter mounting part, said casing comprising:

a first casing in a cup shape;

a second casing in a cup shape;

a projection provided on a circumference of one of said casings;

a guide member provided as a radially non-through groove on a circumference of the other of said casings for guiding said projection when said casings are engaged, said groove including a first axially extending groove part starting from an open end of said other of said casings, a skew groove part extending axially and circumferentially from the first axially extending groove part and a second axially extending groove part stepped from said skew groove part for stopping movement of said projection in a rotational direction; and a filter element detachably held in said casings.

13. A device as in claim 12 further comprising:

an O-ring held on one of said casings; and a taper part and a seal part continuous from said taper part provided on the other of said casings from an open end thereof;

said taper part being structured to be in substantial non-contact with said O-ring when said projection is in said first axially extending groove part and to be in contact with said O-ring when said projection is in said skew groove part, and said seal part being structured to come into contact with said O-ring when said projection is in said second axially extending groove part to thereby seal said casings radially.

14. A device as in claim 12 further comprising:

a biasing member disposed between a bottom of one of said casings and said filter element and biasing said casings axially in a direction of mutual disengagement; and a threaded part provided on a bottom of the other of said casings for detachably attaching said other of said casings to said engine filter mounting part.

15. A spin-on type engine oil filter having a replaceable internal filter element, said filter comprising:

a first member detachable engageable with a second member so as to house a removable filter element therewithin;

one of said members having a threaded spin-on oil passage aperture for readily detachable spin-on connection to an engine oil filter mount;

said members including at least one mating projection-and-groove bayonet-type connection disposed at mated circumferential portions thereof;

a filter element confined between said members when said bayonet-type connection is engaged;

a spring element biasing said members away from each other when they are engaged together;

said bayonet-type connection including both axially-extending portions and circumferentially extending portions configured: (1) to gradually force the two members to move axially toward each other against said spring bias as the two members are rotated in a first direction with respect to each other, (2) to self-lock against further rotation in said first direction after a predetermined amount of rotation so as to facilitate spin-on connection of the filter to an engine oil filter mount; and (3) to restrict rotation of said members in a second opposite direction unless the members are moved axially against said spring bias by a predetermined amount thus inhibiting unintended disengagement of said members;

an O-ring retained at an outer circumference of one of said members; and an O-ring guiding and sealing surface of an outer circumference of the other of said members;

said O-ring guiding and sealing surface including (1) a first axially-extending cylindrical entrance surface having a diameter greater than that of the uncompressed O-ring; (2) a second axially-extending cylindrical seal surface having a diameter less than that of the uncompressed O-ring and being spaced axially from said entrance; and (3) a tapered guiding surface smoothly and continuously joining spaced apart ends of said entrance and seal surfaces.

16. A spin-on type engine oil filter having a replaceable internal filter element said filter comprising:

a first member detachable engageable with a second member so as to house a removable filter element therewithin;

one of said members having a threaded spin-on oil passage aperture for readily detachable spin-on connection to an engine oil filter mount;

said members including at least one mating projection-and-groove bayonet-type connection disposed at mated circumferential portions thereof;

a filter element confined between said members when said bayonet-type connection is engaged;

a spring element biasing said members away from each other when they are engaged together;

said bayonet-type connection including both axially-extending portions and circumferentially extending portions configured: (1) to gradually force the two members to move axially toward each other against said spring bias as the two members are rotated in a first direction with respect to each other; (2) to self-lock against further rotation in said first direction after a predetermined amount of rotation so as to facilitate spin-on connection of the filter to an engine oil filter mount; and (3) to restrict rotation of said members in a second opposite direction unless the members are moved axially against said spring bias by a predetermined amount thus inhibiting unintended disengagement of said members;

wherein each said bayonet-type connection includes a projection on one member and a non-through groove on the other member, said groove including two axially extending segments disposed between at least one skewed segment which extends both axially and circumferentially.

* * * * *